United States Patent Office 3,558,640
Patented Jan. 26, 1971

3,558,640
CERTAIN PYRIDYL AND THIAZOLYL METHYL-THIOPROPIONIC ACIDS AND DERIVATIVES
Tsung-Ying Shen, Westfield, and Conrad P. Dorn, Jr., Plainfield, N.J., assignors to Merck & Co., Inc., Rahway, N.J., a corporation of New Jersey
No Drawing. Filed Dec. 20, 1967, Ser. No. 691,926
Int. Cl. C07d 31/50, 91/34
U.S. Cl. 260—294.8                 5 Claims

ABSTRACT OF THE DISCLOSURE

This invention relates to the preparation of aryl and heteroarylmethylthiopropionic acids, the non-toxic pharmaceutically acceptable salts, esters, amides and the reduced carbonyl products of these aryl and heteroarylmethylthiopropionic acids and derivatives. The compounds of this invention are useful as anti-inflammatory agents and may be used in the treatment of diseases which are susceptible to such agents.

SUMMARY OF THE INVENTION

This invention relates to new sulfide acids and derivatives, processes for preparing the same and their method of treatment as medicinal agents. The disclosed class of compounds in this invention exhibit anti-inflammatory activity and are effective in the prevention and inhibition of edema and granuloma tissue formation.

BACKGROUND OF THE INVENTION

Despite all the research carried on in the development of anti-inflammatory drugs in the past two decades, our knowledge of inflammation remains largely descriptive and we still have little progress; however, we have seen the growth of a great many new drugs. Most of these have been steroids of the 11-oxygenated pregnane series. These, while highly effective, have the drawback of causing many side effects. There is a need in the market for equally effective compounds of much simpler structure and having less side effects.

We have found that the aryl and heteroaryl methylthiopropionic acids of this invention are effective anti-inflammatory agents, simple in structure, easily prepared and have little side effects.

DESCRIPTION AND PREFERRED EMBODIMENTS

This invention relates to new chemical compounds which contain an aryl or heteroaryl radical attached through a methylene or substituted methylene radical to a mercaptopropionic acid and relates further to the non-toxic pharmaceutically acceptable salts, esters, amides and the reduced carbonyl products of these aryl and heteroaryl methylthiopropionic acids. This invention also describes novel methods of preparation to the instant aryl and heteroaryl methylthiopropionic acids and salts, esters, amides and reduced derivatives. This invention further relates to a method of treating inflammation, by the administration of compounds having the following general formula:

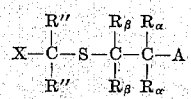

wherein $R_\alpha$, $R_\beta$, $R''$ are described below, A is —COY and —CH$_2$Y where Y is described below and X is a member selected from the group consisting of 3 or fewer fused aromatic rings of 6 atoms or less which may be aryl or heteroaryl rings containing 1 or more of the same or different hetero atoms of N, S or O.

In a more narrow aspect, the present invention embraces a method of treatment of inflammation by the administration of compounds having the structural formulas I–IV:

(I) 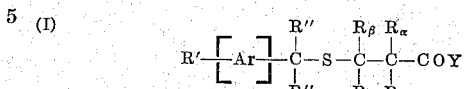

and (III) 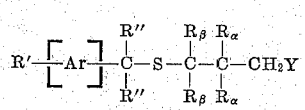

wherein:

Ar is any benzenoid or non-benzenoid aromatic like structure (preferably phenyl, styryl, naphthyl, etc.) containing one or more R' substituents which may be at any position on the ring (preferably at the 2, 4 and 6 positions).

R' is hydrogen, alkyl (preferably loweralkyl such as methyl, ethyl, propyl, isopropyl, etc.), alkenyl (preferably loweralkenyl such as vinyl, allyl, methallyl, etc.), cycloalkyl (preferably cycloloweralkyl such as cyclopropyl, cyclobutyl, etc.), trihalomethyl (preferably trifluoromethyl, etc.), alkanoyl (preferably loweralkanoyl such as acetyl, etc.), hydroxy, alkoxy (preferably loweralkoxy such as methoxy, ethoxy, propoxy, etc.), aryl (preferably mononuclear aryl such as phenyl, tolyl, etc.), aralkyl (preferably mononuclear arloweralkyl such as benzyl, phenethyl, etc.), aryloxy (preferably mononuclear aryloxy such as phenoxy, etc.), aralkoxy (preferably mononuclear arloweralkoxy such as benzyloxy, etc.), mercapto, alkylthio (preferably loweralkylthio such as methylthio, ethylthio, etc.), trifluoromethylthio, alkylsulfonyl (preferably loweralkylsulfonyl such as methylsulfonyl, etc.), sulfamyl, halo (preferably chloro, bromo, fluoro, etc.), cyano, carboxy, nitro, amino monoand dialkylamino (preferably mono- and di-loweralkylamino such as methylamino, ethylamino, dimethylamino, ethylmethylamino, etc.);

$R_\alpha$ and $R_\beta$ are hydrogen, alkyl (preferably loweralkyl such as methyl, ethyl, propyl, isopropyl, etc.), cycloalkyl (preferably cycloloweralkyl such as cyclopropyl, cyclobutyl, etc.), aryl (preferably mononuclear aryl such as phenyl, tolyl, xylyl, etc.), aralkyl (preferably mononuclear arloweralkyl such as benzyl, phenethyl, etc.) or together with another $R_\alpha$ or $R_\beta$ part of a cycloalkyl group (preferably cycloloweralkyl such as cyclopropyl, cyclobutyl, etc.);

R" is hydrogen, alkyl (preferably loweralkyl such as methyl, ethyl, propyl, isopropyl, etc.), cycloalkyl (preferably cycloloweralkyl such as cyclopropyl, cyclobutyl, etc.), aryl (preferably mononuclear aryl such as phenyl, tolyl, xylyl, etc.), aralkyl (preferably mononuclear arloweralkyl such as benzyl, phenethyl, etc.);

Y is —OH, —NH$_2$, alkylamino (preferably loweralkylamino such as methylamino, ethylamino, etc.), dialkylamino (preferably diloweralkylamino such as dimethylamino, methylethylamino, etc.), cycloalkylamino (preferably cycloloweralkylamino such as cyclopropylamino, cyclobutylamino, etc.), N-heterocyclo (preferably N-piperidino, N-morpholino, N-piperazino, N-homopiperazino, N-pyrrolidino, etc.), alkoxy (preferably loweralkoxy such as methoxy, ethoxy, etc.), benzyloxy and OM where M in general is any base which will form an acid addition salt with a carboxylic acid and whose pharmacological properties will not cause an adverse physiologicl effect when ingested by the body system (preferably an alkali, alkaline earth or aluminum metal such as sodium, potassium, calcium, magnesium and aluminum metals).

(II) 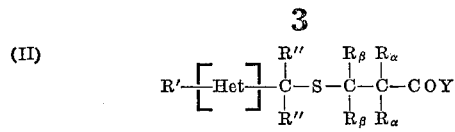

and (IV) 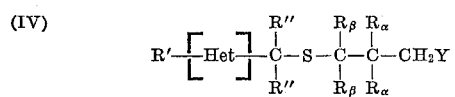

wherein:

Het is any heteroaryl structure (preferably pyrrolyl, thienyl, furyl, quinolyl, thiazolyl, pyridyl, imidazolyl, phenothiazyl, etc.) containing one or more R' substituents which may be at any position on the ring);

R' is hydrogen, alkyl (preferably loweralkyl such as methyl, ethyl, propyl, isopropyl, etc.), alkenyl (preferably loweralkenyl such as vinyl, allyl, methallyl, etc.), cycloalkyl (preferably cycloloweralkyl such as cyclopropyl, cyclobutyl, etc.), hydroxy, alkoxy (preferably loweralkoxy such as methoxy, ethoxy, propoxy, etc.), aryl (preferably mononuclear aryl such as phenyl, tolyl, etc.), aralkyl (preferably mononuclear arloweralkyl such as benzyl, phenethyl, etc.), mercapto, alkylthio (preferably loweralkylthio such as methylthio, ethylthio, etc.), halo (preferably chloro, bromo, fluoro, etc.), cyano, carboxy, nitro, amino, mono- and di-alkylamino (preferably mono- and di-loweralkylamino such as methylamino, ethylamino, dimethylamino, ethylmethylamino, etc.);

$R_\alpha$ and $R_\beta$ are hydrogen, alkyl (preferably loweralkyl such as methyl, ethyl, propyl, isopropyl, etc.), cycloalkyl (preferably cycloloweralkyl such as cyclopropyl, cyclobutyl, etc.), aryl (preferably mononuclear aryl such as phenyl, tolyl, xylyl, etc.), aralkyl (preferably mononuclear arloweralkyl such as benzyl, phenethyl, etc.), or together with another $R_\alpha$ or $R_\beta$ part of a cycloalkyl, group (preferably cycloloweralkyl such as cyclopropyl, cyclobutyl, etc.);

R'' is hydrogen, alkyl (preferably loweralkyl such as methyl, ethyl, propyl, isopropyl, etc.), cycloalkyl (preferably cycloloweralkyl such as cyclopropyl, cyclobutyl, etc.), aryl (preferably mononuclear aryl such as phenyl, tolyl, xylyl, etc.), aralkyl (preferably mononuclearloweralkyl such as benzyl, phenethyl, etc.);

Y is —OH, —NH$_2$, alkylamino (preferably loweralkylamino such as methylamino, ethylamino, etc.), dialkylamino (preferably diloweralkylamino such as dimethylamino, methylethylamino, etc.), cycloalkylamino (preferably cycloloweralkylamino such as cyclopropylamino, cyclobutylamino, etc.), N-heterocyclo (preferably N-piperidino, N-morpholino, N-piperazino, N-homopiperazino, N-pyrrolidino, etc.), alkoxy (preferably loweralkoxy such as methoxy, ethoxy, etc.), benzyloxy and OM where M in general is any base which will form an acid addition salt with a carboxylic acid and whose pharmacological properties will not cause an adverse physiological effect when ingested by the body system (preferably an alkali, alkaline earth or aluminum metal such as sodium, potassium, calcium, magnesium and aluminum metals).

A more preferred aspect of this invention relates to the method for the relief of inflammation in a patient which comprises the administration of compounds of the structural Formulas I–IV and their salts.

(I) 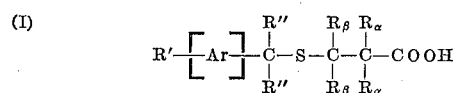

(II) 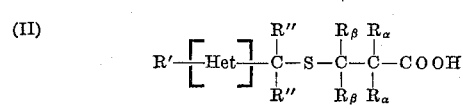

and (III) 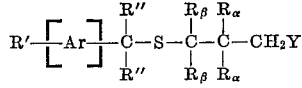

(IV) 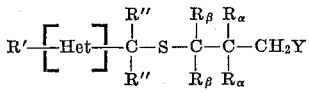

wherein:

Ar is phenyl, styryl or naphthyl;
Het is pyridyl, thiazolyl;
R' is hydrogen or halo (such as 2-chloro, 2,6-dichloro and 4-fluoro);
$R_\alpha$ and $R_\beta$ are hydrogen and lower alkyl (such as methyl);
R'' is hydrogen;
Y is —OH and —NH$_2$.

The foregoing classes of acid and alcohol compounds exhibit particularly good anti-inflammatory activity and represents preferred sub-groups of compounds within the scope of this invention.

The invention further relates to novel compounds having the structural Formulas I–IV:

(I) 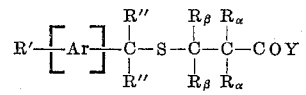

wherein:

Ar is any benzenoid or non-benzenoid aromatic like structure (preferably phenyl, styryl or naphthyl) containing one or more R' substituents which may be at any position on the ring (preferably at the 2, 4 and 6 positions);

R' is hydrogen (provided $R_\alpha$, $R_\beta$ and R'' are not all hydrogen at the same time Y is —OH and Ar is phenyl), alkyl (preferably loweralkyl such as methyl, ethyl, propyl, isopropyl, etc.), alkenyl (preferably loweralkenyl such as vinyl, allyl, methallyl, etc.), cycloalkyl (preferably cycloloweralkyl such as cyclopropyl, cyclobutyl, etc.), trihalomethyl (preferably trifluoromethyl, etc.), alkanoyl (preferably loweralkanoyl such as acetyl, etc.), hydroxy, alkoxy (preferably loweralkoxy such as methoxy, ethoxy, propoxy, etc., provided $R_\alpha$, $R_\beta$ and R'' are not all hydrogen at the same time when R' is 4-methoxy, Y is —OH and Ar is phenyl), aryl (preferably mononuclear aryl such as phenyl, tolyl, etc.), aralkyl (preferably mononuclear aralkyl such as benzyl, phenethyl, etc.), aryloxy (preferably mononuclear araloxy such as phenoxy, etc.), aralkoxy (preferably mononuclear aralkoxy such as benzyloxy, etc.), mercapto, alkylthio (preferably loweralkylthio such as methylthio, ethylthio, etc.), trifluoromethylthio, alkylsulfonyl (preferably loweralkylsulfonyl such as methylsulfonyl, etc.), sulfonamido, halo (preferably chloro, bromo, fluoro, etc., provided $R_\alpha$, $R_\beta$ and R'' are not all hydrogen at the same time when R' is 4-chloro, Y is —OH and Ar is phenyl), cyano, carboxy, nitro (provided $R_\alpha$, $R_\beta$ and R'' are not all hydrogen at the same time when R' is 2- or 4-nitro, Y is —OH and Ar is phenyl), amino (provided $R_\alpha$, $R_\beta$ and R'' are not all hydrogen at the same time when R' is 2-amino, Y is —OH and Ar is phenyl), mono- and dialkylamino (preferably mono- and diloweralkylamino such as methylamino, dimethylamino, ethylamino, ethylmethylamino, etc.);

$R_\alpha$ and $R_\beta$ are hydrogen (provided R', R'' and the remaining $R_\alpha$ and $R_\beta$ groups are not all hydrogen at the same time when Y is —OH and Ar is phenyl), alkyl (preferably loweralkyl such as methyl, ethyl, propyl, isopropyl, etc., provided R', R'' and the remaining $R_\alpha$ and $R_\beta$ groups are not all hydrogen at the same time when $R_\alpha$ or $R_\beta$ is one methyl or ethyl group, Y is —OH and Ar is phenyl), cycloalkyl (preferably cycloloweralkyl such as cyclopropyl, cyclobutyl, etc.), aryl (preferably mononuclear aryl such as phenyl, tolyl, xylyl, etc., provided R', R" and the remaining $R_\alpha$ and $R_\beta$ groups are not all hydrogen at the same time when $R_\alpha$ or $R_\beta$ is one phenyl group, Y is —OH and Ar is phenyl), aralkyl (preferably mononuclear loweralkyl such as benzyl, phenethyl, etc.) or together with another $R_\alpha$ or $R_\beta$ part of a cycloalkyl group (preferably cycloloweralkyl such as cyclopropyl, cyclobutyl, etc.);

R" is hydrogen (provided $R_\alpha$, $R_\beta$, R' and the remaining R" group are not all hydrogen at the same time when Y is —OH and Ar is phenyl), alkyl (preferably loweralkyl such as methyl, ethyl, propyl, isopropyl, etc., provided $R_\alpha$, $R_\beta$, R' and the remaining R" group are not all hydrogen at the same time when R" is a methyl group, Y is —OH and Ar is phenyl), cycloalkyl (preferably cycloloweralkyl such as cyclopropyl, cyclobutyl, etc.), aryl (preferably mononuclear aryl such as phenyl, tolyl, xylyl, etc., provided $R_\alpha$, $R_\beta$, R' and the remaining R" group are not all hydrogen at the same time when R" is one phenyl or when the remaining R" group is also phenyl, Y is —OH and Ar is phenyl) aralkyl (preferably mononuclear arloweralkyl such as benzyl, phenethyl, etc., provided $R_\alpha$, $R_\beta$, R' and the remaining R" group are not all hydrogen at the same time when R" is a benzyl group, Y is —OH and Ar is phenyl);

Y is —OH, —NH$_2$, alkylamino (preferably loweralkylamino such as methylamino, ethylamino, etc.), dialkylamino (preferably diloweralkylamino such as dimethylamino, methylethylamino, etc.), cycloalkylamino (preferably cycloloweralkylamino such as cyclopropylamino, cyclobutylamino, etc.), N-heterocyclo (preferably N-piperidino, N-morpholino, N-piperazino, N-homopiperazino, N-pyrrolidino), alkoxy (preferably loweralkoxy such as methoxy, ethoxy, etc.), benzyloxy and OM where M in general is any base which will form an acid addition salt with a carboxylic acid and whose pharmacological properties will not cause an adverse physiological effect when ingested by the body system (preferably an alkali, alkaline earth or aluminum salt such as sodium, potassium, calcium, magnesium and aluminum metals).

(II)

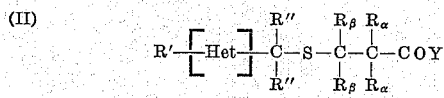

wherein:

Het is any heteroaryl structure (preferably pyrrolyl, thienyl, furyl, quinolyl, thiazolyl, pyridyl, imidazolyl, phenothiazyl, etc.), containing one or more R' substituents which may be at any position of the ring;

R' is hydrogen, alkyl (preferably loweralkyl such as methyl, ethyl, propyl, isopropyl, etc.), alkenyl (preferably loweralkenyl such vinyl, allyl, methallyl, etc.), cycloalkyl (preferably cycloloweralkyl such as cyclopropyl, cyclobutyl, etc.), hydroxy, alkoxy (preferably loweralkoxy such as methoxy, ethoxy, propoxy, etc.), aryl (preferably mononuclear aryl such as phenyl, tolyl, etc.), aralkyl (preferably mononuclear arloweralkyl such as benzyl, phenethyl, etc.), mercapto, alkylthio (preferably loweralkylthio such as methylthio, ethylthio, etc.), halo (preferably chloro, bromo, fluoro, etc.), cyano, carboxy, nitro, amino, mono- and dialkylamino (preferably mono- and di-loweralkylamino such as methylamino, ethylamino, dimethylamino, ethylmethylamino, etc.);

$R_\alpha$ and $R_\beta$ are hydrogen, alkyl (preferably loweralkyl such as methyl, ethyl, propyl, isopropyl, etc.), cycloalkyl (preferably cycloloweralkyl such as cyclopropyl, cyclobutyl, etc.), aryl (preferably mononuclear aryl such as phenyl, tolyl, xylyl, etc.), aralkyl (preferably mononuclear arloweralkyl such as benzyl, phenethyl, etc.) or together with another $R_\alpha$ or $R_\beta$ part of a cycloalkyl group (preferably cycloloweralkyl such as cyclopropyl, cyclobutyl, etc.);

R" is hydrogen, alkyl (preferably loweralkyl such as methyl, ethyl, propyl, isopropyl, etc.), cycloalkyl (preferably cycloloweralkyl such as cyclopropyl, cyclobutyl, etc.), aryl (preferably mononuclear aryl such as phenyl, tolyl, xylyl, etc.), aralkyl (preferably mononuclear arloweralkyl such as benzyl, phenethyl, etc.);

Y is —OH, —NH$_2$, alkylamino (preferably loweralkylamino such as methylamino, ethylamino, etc.), dialkylamino (preferably diloweralkylamino such as dimethylamino, methylethylamino, etc.), cycloalkylamino (preferably cycloloweralkylamino such as cyclopropylamino, cyclobutylamino, etc.), N-heterocyclo (preferably N-piperidino, N-morpholino, N-piperazino, N-homopiperazino, N-pyrrolidino, etc.), alkoxy (preferably loweralkoxy such as methoxy, ethoxy, etc.), benzyloxy and OM where M in general is any base which will form an acid addition salt with a carboxylic acid and whose pharmacological properties will not cause an adverse physiological effect when ingested by the body system (preferably an alkali, alkaline earth or aluminum metal such as sodium, potassium, calcium, magnesium and aluminum metals).

(III)

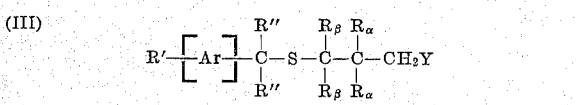

wherein:

Ar is any benzenoid or non-benzenoid aromatic like structure (preferably phenyl, styryl or naphthyl) containing one or more R' sibstituent which may be substituted at any position on the ring (preferably at the 2, 4 and 6 positions).

R' is hydrogen (provided $R_\alpha$, $R_\beta$ and R" are not all hydrogen at the same time when Y is —OH and Ar is phenyl), alkyl (preferably loweralkyl such as methyl, ethyl, propyl, isopropyl, etc.), alkenyl (preferably lower alkenyl such as vinyl, allyl, methallyl, etc.), cycloalkyl (preferably cycloloweralkyl such as cyclopropyl, cyclobutyl, etc.), trihalomethyl (preferably trifluoromethyl, etc.), alkanoyl (preferably loweralkanoyl such as acetyl, etc.), hydroxy, alkoxy (preferably loweralkoxy such as methoxy, ethoxy, propoxy, etc.), aryl (preferably mononuclear aryl such as phenyl, tolyl, etc.), aralkyl (preferably mononuclear aralkyl such as benzyl, phenethyl, etc.), aryloxy (preferably mononuclear araloxy such as phenoxy, etc.), aralkoxy (preferably mononuclear aralkoxy such as benzyloxy, etc.), mercapto, alkylthio (preferably loweralkylthio such as methylthio, ethylthio, etc.), trifluoromethylthio, alkylsulfonyl (preferably loweralkylsulfonyl such as methylsulfonyl, etc.), sulfamyl, halo (preferably chloro, bromo, fluoro, etc.), cyano, carboxy, nitro, amino, mono- and dialkylamino (preferably mono- and di-loweralkylamino such as methylamino, ethylamino, dimethylamino, ethylmethylamino, etc.);

$R_\alpha$ and $R_\beta$ are hydrogen (provided R', R" and the remaining $R_\alpha$ and $R_\beta$ groups are not all hydrogen at the same time when Y is —OH and Ar is phenyl), alkyl (preferably loweralkyl such as methyl, ethyl, propyl, isopropyl, etc.), cycloalkyl (preferably cycloloweralkyl such as cyclopropyl, cyclobutyl, etc.), aryl (preferably mononuclear aryl such as phenyl, tolyl, xylyl, etc.), aralkyl (preferably mononuclear arloweralkyl such as benzyl, phenethyl, etc.) or together with another $R_\alpha$ or $R_\beta$ part of a cycloloweralkyl group such as cyclopropyl, cyclobutyl, etc.);

R" is hydrogen (provided $R_\alpha$, $R_\beta$, R' and the remaining R" group are not all hydrogen at the same time when Y is —OH and Ar is phenyl), alkyl (preferably loweralkyl such as methyl, ethyl, propyl, isopropyl, etc.), cycloalkyl (preferably cycloloweralkyl such as cyclopropyl, cyclobutyl, etc.), aryl (preferably mononuclear aryl such as phenyl, tolyl, xylyl, etc.), aralkyl (preferably mononuclear arloweralkyl such as benzyl, phenethyl, etc.);

Y is —OH, —NH$_2$, alkylamino (preferably loweralkylamino such as methylamino, ethylamino, etc.), dialkylamino (preferably diloweralkylamino such as dimethylamino, methylethylamino, etc.), cycloalkylamino (preferably cycloloweralkylamino such as cyclopropylamino, cyclobutylamino, etc.), N-heterocyclo (preferably N-piperidino, N-morpholino, N-piperazino, N-homopiperazino, N-pyrrolidino), alkoxy (preferably loweralkoxy such as methoxy, ethoxy, etc.), benzyloxy and OM where M in general is any base which will form an acid addition salt with a carboxylic acid and whose pharmacological properties will not cause an adverse physiological effect when ingested by the body system (preferably an alkali, alkaline earth or aluminum metal such as sodium, potassium, calcium, magnesium and aluminum metals).

(IV) 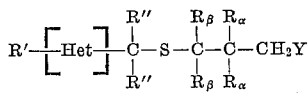

wherein:

Het is any heteroaryl structure (preferably pyrrolyl, thienyl, furyl, quinolyl, thiazolyl, pyridyl, imidazolyl, phenothiazinyl, etc.) containing one or more R' substituent which may be substituted at any position on the ring;

R' is hydrogen, alkyl (preferably loweralkyl such as methyl, ethyl, propyl, isopropyl, etc.), alkenyl (preferably loweralkenyl such as vinyl, allyl, methallyl, etc.), cycloalkyl (preferably cycloloweralkyl such as cyclopropyl, cyclobutyl, etc.), hydroxy, alkoxy (preferably loweralkoxy such as methoxy, ethoxy, propoxy, etc.), aryl (preferably mononuclear aryl such as phenyl, tolyl, etc.), aralkyl (preferably mononuclear arloweralkyl such as benzyl, phenethyl, etc.), mercapto, alkylthio (preferably loweralkylthio such as methylthio, ethylthio, etc.), halo (preferably chloro, bromo, fluoro, etc.), cyano, carboxy, nitro, amino, mono- and dialkylamino (preferably mono- and di-loweralkylamino such as methylamino, ethylamino, dimethylamino, ethylmethylamino, etc.);

$R_\alpha$ and $R_\beta$ are hydrogen, alkyl (preferably loweralkyl such as methyl, ethyl, propyl, isopropyl, etc.), cycloalkyl (preferably cycloloweralkyl such as cyclopropyl, cyclobutyl, etc.), aryl (preferably mononuclear aryl such as phenyl, tolyl, xylyl, etc.), aralkyl (preferably mononuclear arloweralkyl such as benzyl, phenethyl, etc.) or together with another $R_\alpha$ or $R_\beta$ part of a cycloalkyl group (preferably cycloloweralkyl such as cyclopropyl, cyclobutyl, etc.);

R" is hydrogen, alkyl (preferably loweralkyl such as methyl, ethyl, propyl, isopropyl, etc.), cycloalkyl (preferably cycloloweralkyl such as cyclopropyl, cyclobutyl, etc.), aryl (preferably mononuclear aryl such as phenyl, tolyl, xylyl, etc.), aralkyl (preferably mononuclear arloweralkyl such as benzyl, phenethyl, etc.);

Y is —OH, —NH$_2$, alkylamino (preferably loweralkylamino such as methylamino, ethylamino, etc.), dialkylamino (preferably diloweralkylamino such as dimethylamino, methylethylamino, etc.), cycloalkylamino (preferably cycloloweralkylamino such as cyclopropylamino, cyclobutylamino, etc.), N-heterocyclo (preferably N-piperidino, N-morpholino, N-piperazino, N-homopiperazino, N-pyrrolidino, etc.), alkoxy (preferably loweralkoxy such as methoxy, ethoxy, etc.), benzyloxy and OM where M in general is any base which will form an acid addition salt with a carboxylic acid and whose pharmacological properties will not cause an adverse physiological effect when ingested by the body system (preferably an alkali, alkaline earth or aluminum metal such as sodium, potassium, calcium, magnesium or aluminum metals).

The more preferred compounds of this invention relate to the acids, alcohols, amines and the salts thereof of the following Formulas I–IV:

(I) 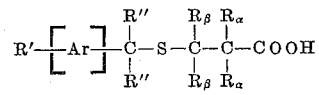

wherein:

Ar is phenyl, styryl and naphthyl;

R' is hydrogen (provided $R_\alpha$, $R_\beta$ and R" are not all hydrogen at the same time when Ar is phenyl) or halogen (such as 2-chloro, 2,6-dichloro and 4-fluoro provided $R_\alpha$, $R_\beta$ and R" are not all hydrogen at the same time when R' is 4-chloro and Ar is phenyl);

R" is hydrogen (provided $R_\alpha$, $R_\beta$, R' and the remaining R" groups are not all hydrogen at the same time when Ar is phenyl);

$R_\alpha$ and $R_\beta$ are hydrogen (provided R' and R" are not all hydrogen at the same time when Ar is phenyl) or lower alkyl (such as methyl provided R', R" and the remaining $R_\alpha$ and $R_\beta$ groups are not all hydrogen at the same time when $R_\alpha$ or $R_\beta$ is one methyl or ethyl group and Ar is phenyl).

(II) 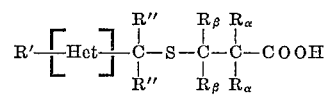

wherein:

Het is pyridyl, thiazolyl;

$R_\alpha$, $R_\beta$, R' and R" are all hydrogen.

(III) 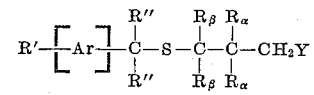

wherein:

Ar is phenyl, styryl and naphthyl;

R' is hydrogen (provided $R_\alpha$, $R_\beta$ and R" are not all hydrogen at the same time when Ar is phenyl and Y is —OH) or halogen (such as 2-chloro, 2,6-dichloro and 4-fluoro);

R" is hydrogen (provided $R_\alpha$, $R_\beta$, R' and the remaining R" groups are not all hydrogen at the same time when Ar is phenyl and Y is —OH);

$R_\alpha$ and $R_\beta$ are hydrogen (provided R' and R" are not all hydrogen at the same time when Ar is phenyl and Y is —OH) or loweralkyl (such as methyl);

Y is —OH and —NH$_2$.

(IV) 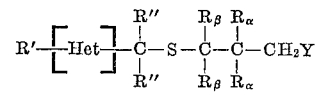

wherein:

Het is pyridyl, thiazolyl;

$R_\alpha$, $R_\beta$, R' and R" are all hydrogen;

Y is —OH and —NH$_2$.

Representative compounds of this invention are as follows:

3-(2-chlorobenzylthio)-propionic acid
3-(2,6-dichlorobenzylthio)-propionic acid
3-(1-naphthylmethylthio)-propionic acid
3-(2-pyridylmethylthio)-propionic acid
3-(4-thiazolylmethylthio)-propionic acid
3-(cinnamylthio)-propionic acid
3-(2-chlorobenzylthio)-propanol
3-(2,6-dichlorobenzylthio)-propanol
3-(benzylthio)-propylamine We have found that the compounds of this invention have a useful degree of anti-inflammatory activity and are effective in the treatment of arthritic and dermatological disorders and in like conditions which are responsive to treatment with anti-inflammatory agents. For these purposes they are normally administered orally in tablets or capsules, the optimum dosage depending, of course, on the particular compound being used and the type and severity of the condition being treated. Although the optimum quantities of the compounds of this invention to be used in such manner will depend on the compound employed and the particular type of disease condition treated, oral dose levels of preferred compounds in the range of 0.5–30 mg./kg. (preferably in the range of 3–15 mg./kg. per day) are useful in control of arthritic conditions, depending on the activity of the specific compound and the reaction sensitivity of the patient.

Various tests in animals have been carried out to show the ability of compounds of this invention to exhibit reactions that can be correlated with anti-inflammatory activity in humans.

The following table shows the ability of the instant compounds to inhibit edema induced by injection of an inflammatory agent into the tissues of the foot of a rat against non-inflamed controls. This Carrageenin testing method is known to correlate well with anti-inflammatory activity in humans and is a standard test used to determine anti-inflammatory activities. This correlation has been shown by the activities of compounds known to be clinically active, including Indocin, Aspirin, Butazolidin, Tandearil, Cortone, Hydrocortone, Decadron. In view of these results the instant compounds can be considered to be active anti-inflammatory agents. The inhibitions given are the average results from six adult male Sprague-Dawley rats in each single test.

| Compound | Edema dose, mg./kg. | Percent inhibition |
|---|---|---|
| 3-(2-chlorobenzylthio)-propionic acid | 100 | 52 |
| 3-(2,6-dichlorobenzylthio)-propionic acid | 100 | 63 |
| 3-(1-naphthylmethylthio)-propionic acid | 100 | 49 |
| 3-(2-pyridylmethylthio)-propionic acid | 100 | 61 |
| 3-(4-thiazolylmethylthio)-propionic acid | 100 | 64 |
| 3-(cinnamylthio)-propionic acid | 100 | 25 |
| 3-(benzylthio)-propylamine | 100 | 60 |
| 3-(3-chlorobenzylthio)-propionic acid | 100 | 23 |
| 3-(3,4-dichlorobenzylthio)-propionic acid | 100 | 36 |
| 3-(4-fluorobenzylthio)-propionic acid | 100 | 49 |
| 3-(4-phenylbenzylthio)-propionic acid | 100 | 22 |
| 3-(2,3,4,5,6-pentafluorobenzylthio)-propionic acid | 100 | 46 |
| 3-(2-naphthylbenzylthio)-propionic acid | 100 | 21 |

The following table also shows the ability of the instant compounds to inhibit edema in the Adjuvant arthritis test. This testing method is also known to correlate with anti-inflammatory activity in humans. The inhibitions given are also the average results from six adult male Sprague-Dawley rats in each single test. The results of this test also show that the instant compounds can be considered active anti-inflammatory agents.

| Compound | Edema dose, mg./kg. | Percent inhibition |
|---|---|---|
| 3-(2-chlorobenzylthio)-propionic acid | 10 | 86 |
| 3-(2,6-dichlorobenzylthio)-propionic acid | 10 | 0 |
| 3-(1-naphthylmethylthio)-propionic acid | 10 | 35.5 |
| 3-(2-pyridylmethylthio)-propionic acid | 10 | 37.5 |
| 3-(4-thiazolylmethylthio)-propionic acid | 10 | 13 |
| 3-(cinnamylthio)-propionic acid | 10 | 69 |
| 3-(benzylthio)-propylamine | 10 | 0 |
| 3-(3-chlorobenzylthio)-propionic acid | 10 | 50 |
| 3-(3,4-dichlorobenzylthio)-propionic acid | 10 | 35 |
| 3-(4-fluorobenzylthio)-propionic acid | 10 | 65 |
| 3-(4-phenylbenzylthio)-propionic acid | 10 | 57 |
| 3-(2,3,4,5,6-pentafluorobenzylthio)-propionic acid | 10 | 0 |
| 3-(2-naphthylbenzylthio)-propionic acid | 10 | 0 |

In addition to their pharmacological activity, the aryl (and heteroaryl) methylthiopropionic acid products of this invention are useful as intermediates in preparing the ester, amide and reduced product derivatives described and claimed herein. The said aryl (and heteroaryl) methylthiopropionic acid esters, amides and reduced compounds also exhibit anti-inflammatory activity and, therefore, are useful in the treatment of these disorders.

The aryl (and heteroaryl) methylthiopropionic acids and derivatives of this invention are conveniently prepared by the following methods:

METHOD I (a) The reaction of an appropriately substituted aryl or heteroarylmethyl halide with an available mercaptopropionic acid or derivative which has proper branching. The following equations illustrate this method of preparation:

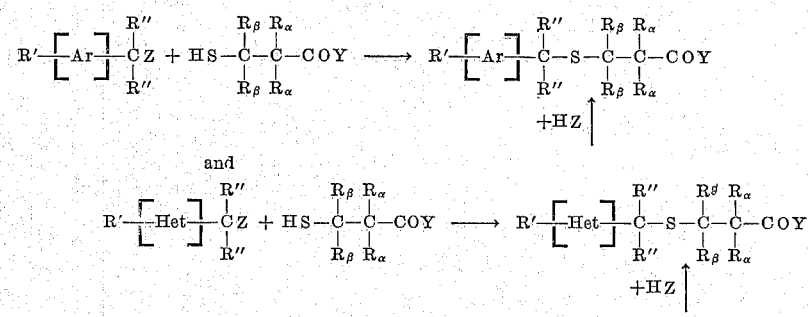

wherein:

Ar, Het, R′, $R_\beta$, $R_\alpha$, R″ and Y are as previously defined above and Z is halogen (such as chloro, bromo, etc.). The reaction can be carried out neat at a reasonable temperature (preferably 125–175° C.) until the evolution of hydrogen halide gas has stopped. The product is then isolated by treatment with water, addition of a suitable inorganic acid (such as hydrochloric acid) to adjust to acidic conditions, extraction with a suitable solvent (such as chloroform, ether, etc.), removal of the solvent in vacuo and purification of the residue by recrystallization from non-polar solvents (such as hexane, benzene, carbon tetrachloride, petroleum ether, etc.).

(b) Carrying out the above reaction in a suitable solvent (preferably a non-polar solvent such as benzene, toluene, xylene, etc.) and heating at a reasonable temperature of about 50–160° C. (preferably reflux temperature) until the evolution of hydrogen halide gas has stopped, followed by evaporation to dryness. The product is isolated by acidifying and extracting from the reaction mixture as in (a).

(c) Carrying out the above reaction in the presence of any suitable alkali (such as sodium hydroxide, potassium hydroxide, etc.), in an aqueous alcoholic medium (preferably a loweralkanol such as ethanol, etc.) and heating at a reasonable temperature of about 50–160° C. (preferably reflux temperature) until the reaction is completed (preferably 2–10 hours). This is then evaporated to dryness and the product is isolated from the residue as in part (a).

(d) Carrying out the above reaction in liquid ammonia at a reasonable temperature (preferably at reflux temperature), evaporating to dryness, and isolating the product from the residue as in part (a).

METHOD II

An alternate method is the reaction of an appropriately substituted aryl or heteroarylmethylmercaptan with an available halopropionic acid or derivative that has proper branching using the reaction conditions of Method I.

The following equations illustrate this method of preparation:

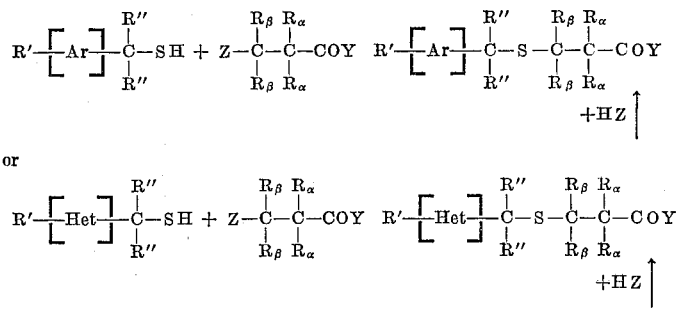

wherein:
Ar, Het, R', $R_\beta$, $R_\alpha$ and R'' are as previously defined above and Z is halogen (such as chloro, bromo, etc.).

The more preferred aspects of this invention involve synthesis of the instant acids according to Methods I and II above in which the reaction is carried out neat or in liquid ammonia.

The ester and amide derivatives of the instant carboxylic acid products can also be prepared by conventional methods well known to those skilled in the art. Thus, for example, the ester derivatives may be prepared by the reaction of an aryl (or heteroaryl) methylthiopropionic acid with an alcohol such as with a loweralkyl alcohol in the presence of a suitable catalyst such as in the presence of sulfuric acid, boron trifluoride etherate, dry hydrogen chloride gas, etc. or, alternatively, the aryl (or heteroaryl) methylthiopropionic acid may be converted to its acid halide by conventional methods and the acid halide thus formed may be reacted with an appropriate lower alkanol. The methyl ester may also be prepared in the usual manner with diazomethane.

The amide derivatives of the instant aryl (and heteroaryl) methylthiopropionic acids may be prepared by treating the acid halide of the said products with ammonia or with an appropriate monoalkylamine, dialkylamine or heterocyclic amine (such as pyrrolidine, piperidine, piperazine, homopiperazine, morpholine, etc.) to produce the corresponding amide. Still another process for preparing the said amide derivatives comprise converting an ester derivative of an aryl (or heteroaryl) methylthiopropionic acid to its corresponding amide by treating the said ester with ammonia or with an appropriate monoalkylamine, dialkylamine or heterocyclic amine to produce the corresponding amide derivative. These and other equivalent methods for the preparation of the ester and amide derivatives of the instant products will be apparent to those having ordinary skill in the art.

This invention further relates to the acid addition salts formed by the action of a suitable base with a carboxylic acid. Suitable bases thus include for example the alkali metal alkoxides such as sodium methoxide, etc. and the alkali metal and alkaline earth metal hydroxides, carbonates, bicarbonates, etc. (such as sodium hydroxide, potassium hydroxide, calcium hydroxide, potassium carbonate, sodium bicarbonate, magnesium bicarbonate, etc.). Also, the aluminum salts of the instant products may be obtained by treating the corresponding sodium salt with an appropriate aluminum complex such as aluminum chloride hexahydrate, etc. The acid addition salts thus obtained are the functional equivalent of the corresponding aryl (and heteroaryl) methylthiopropionic acid products and one skilled in the art will appreciate that to the extent that the instant carboxylic acids are useful in therapy, the variety of acid addition salts embraced by this invention are limited only by the criterion that the bases employed in forming the salts be both non-toxic and physiologically acceptable.

This invention further embodies the reduced carbonyl products as represented by Formulas III and IV, namely, the alcohol, ether and amine derivatives and the salts thereof.

The alcohol, ether and amine derivatives of this invention may be prepared according to the methods disclosed for preparing the instant acids and derivatives. Thus, for example, the thiopropanols, thiopropylethers and thiopropylamines may be reacted with the aryl and heteroarylmethylhalides using the reaction conditions set forth in method I above to prepare the corresponding aryl and heteroarylmethylthiopropanols, ethers and amines. Further, the desired halopropanols, halopropylethers and halopropylamines may be reacted with the aryl and heteroarylmethylmercaptans using the reaction conditions set forth in method II above to prepare the corresponding aryl and heteroarylmethylthiopropanols, ethers and amines.

The alcohol, amine and ether compounds may also be prepared by conventional methods well known to those skilled in the art. Thus, for example, the alcohol may be prepared by the lithium aluminum hydride reduction of the appropriate aryl or heteroarylmethylthiopropionic acid or ester by carrying out the reduction in the usual procedure of adding an etherial solution of the acid or ester to a solution of the hydride. This is described in "Reduction with Complex Metal Hydrides" by Norman G. Gaylord, 1956, Interscience on page 322 forward (acids) and page 391 forward (esters). This reduction procedure should not be used, however, when the R' substituent on the aryl or heteroaryl ring can also be reduced as with an alkanoyl, alkylsulfonyl, sulfonamido, cyano, carboxy and nitro. The preferred method in these instances is the reduction to the desired alcohol before the condensations with method I or II takes place. The alcohols may also be prepared by condensing the appropriate aryl or heteroaryl aldehyde with the desired mercaptopropionic acid as found in J.A.C.S. 81, p. 6087 (1959).

The ethers may also be made in the conventional manner from alkylation of the alcohols with a diazomethane solution or refluxing the alcohol with an alkaline solution and alkyl sulfate. The Williamson synthesis involving the reaction of a metallic alkoxide with an alkyl halide may also be employed.

Lithium aluminum hydride reduction of the instant amides yields the instant amines. These reactions are usually carried out without difficulty but should not be used, however, when the R' substituent on the aryl or heteroaryl ring can also be reduced as with an alkanoyl, alkylsulfonyl, sulfonamido, cyano, carboxy and nitro. The preferred method in these instances is the reduction to the desired amine before the condensation with method I or II takes place. A further method may be employed by using the carboxylic acids with formation of the corresponding azides followed by hydrolysis. Also, the reduction of the amides using 200–300 atmospheres of hydrogen at 240–270° C. in the presence of at least 15% copper chromite will again effect the desired amines. Treatment of the salts of halopropylamines with aryl or heteroarylmethyl mercaptans under alkaline conditions may afford the desired aryl or heteroarylmethylthiopropylamines.

Appropriately desired end products having various R' substituents can be prepared using suitable reactions in order to convert one R' group to another. Thus, for example, using conventional methods a halogen group can be treated under Sandmeyer conditions to the nitrile compound which in turn can be hydrolyzed to a carboxy. Formation of the acid halides followed by alkylation affords the alkanoyl groups. A nitro can be reduced to an amino group and a hydroxy compound can be prepared by dimethylation of a methoxy substituent. Mercapto groups can be converted into alklthio or alkylsulfonyl groups using conventional methods and can further be oxidized to the sulfonic acids which can be converted to sulfonyl compounds.

The products of this invention can contain asymmetric carbon atoms of the aryl and heteroarylmethylthiopropionic acid and amine molecules and their derivatives and, therefore, may be obtained as racemic mixtures of their dextro and levorotatory isomers. These may be separated by any of the various methods of resolution. A method that may be employed is combining the racemic compound with an optically active compound, for example, by salt formation. Two products are then obtained. If the instant acids are added to an optically active base, such as the dextrorotatory alkaloid cinchonine, then the salts produced possess different properties and different solubilities and can be separated by fractional crystallization. When the salts have been completely separated by repeated crystallization the base is split off and the pure d- or l-acids are obtained. Optically active acids may also be used to resolve the amine compounds. The alcohols may also be resolved by conventioinal methods. A review of these methods may be found in Organic Reactions, volume II, Resolution of Alcohols, chapter 9, pp. 376–414 (John Wiley & Sons, New York, 1944). It is to be understood that the said dextro and levo isomers are embraced within the scope of this invention.

The aryl and heteroarylmethyl halide starting materials employed in these foregoing methods can be conveniently prepared by the following reactions:

(A)

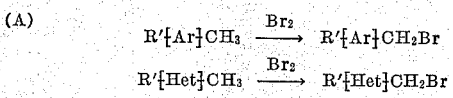

wherein Ar, Het, and R' are as defined above.

The reaction is normally conducted by adding a carbon tetrachloride solution of bromine to a carbon tetrachloride solution of the appropriate starting material under reflux and the influence of ultraviolet irradiation. Other halogenated hydrocarbons (such as chloroform, tetrachloroethylene, etc.) can be used equally well at any reasonable temperature, reflux being most convenient.

(B)

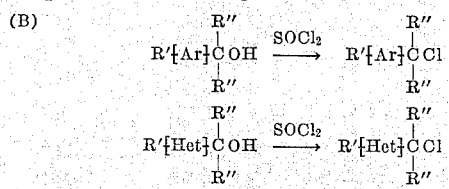

wherein Ar, Het, R'' and R' are as defined above.

The reaction is normally conducted by treating a benzene solution of an alcohol with thionyl chloride at reflux temperature for about one hour. This can also be performed in other inert solvents (such as toluene, chloroform, carbon tetrachloride, etc.) or by using excess thionyl chloride as solvent. Any temperature from about 50 to 150° is satisfactory, but again reflux temperature is most convenient.

The aryl and heteroarylmethyl mercaptan starting materials can be conveniently prepared from the preceding aryl and heteroarylmethyl halides by treatment for several hours with thiourea in a suitable solvent (such as methanol, ethanol, etc.) at an elevated temperature, reflux again being most convenient. This is then followed by additional heating with an aqueous base (such as NaOH, etc.) and then isolating the desired product with a suitable organic solvent (such as ether, chloroform, etc.). This may be represented by the following equation:

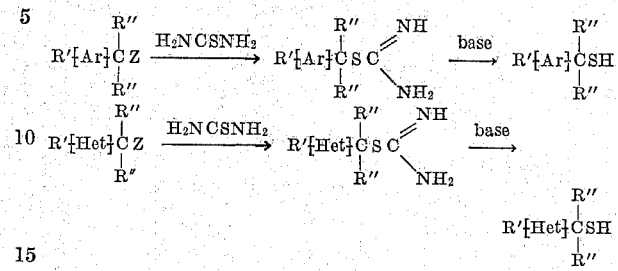

wherein Ar, Het, R', R'' and Z are as defined above.

A further method of preparation for the starting mercaptan is the reaction of the aryl and heteroarylmethyl halide with a salt of a thioacid (such as sodium thiosulfate) to form the so-called Bunte salt. Hydrolysis affords a convenient and economical method of preparing the desired mercaptans. This method may be used to prepare starting materials that are difficult to synthesize by other methods. This may be represented by the following equation:

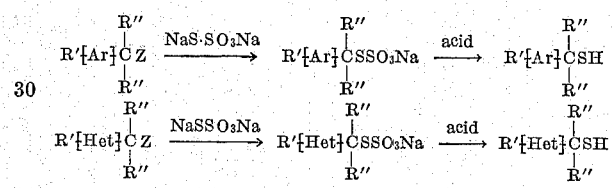

wherein Ar, Het, R', R'' and Z are as defined above.

Still another method of formulation of the aryl and heteroarylmethyl mercaptans is the reaction of sulfur with the aryl and the heteroarylmethyl Grignards as shown in the following equation:

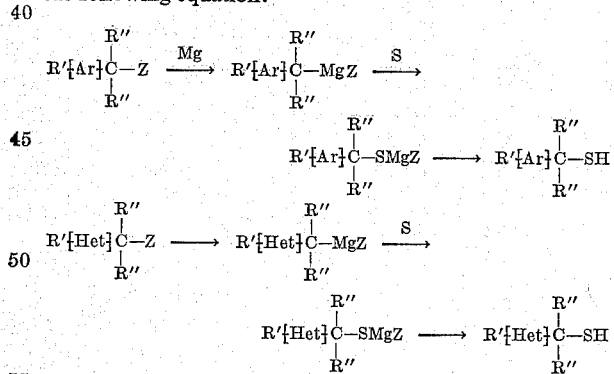

wherein Ar, Het, R', R'' and Z are as defined above.

A review of the preparation of mercapto acids can be found in O.C. of Bivalent Sulfur, volume I, E. Emmet Reid, Chemical Publishing Co. (1958). Chapter 5, Mercapto-Acids p. 436 forward.

The syntheses of halo propionic acids are scattered throughout the literature and have been prepared by various methods.

The halo and thiopropionic acid esters and amides as well as the halo and thiopropyl alcohols, ethers and amines used in this application may be prepared by conventional methods from the halo and thiopropionic acids. The most convenient methods are those that are outlined in this application for conversion of the aryl and heteroarylmethylthiopropionic acids to the corresponding esters, amides, alcohols, ethers and amines.

The following are a group of detailed examples which show the preparation of the desired compounds of this invention. They are to be construed as illustrations of the invention and not as limitations thereof.

EXAMPLE 1

2,4-difluorobenzylbromide

A solution of 25.3 g. of 2,4-difluorotoluene in 200 ml. of dry carbon tetrachloride is heated to reflux with stirring while 27 g. of bromine in 50 ml. of carbon tetrachloride is added dropwise under ultraviolet irradiation. After the bromine color disappears (about ½ hour), the solution is cooled, washed with ice water, dried over magnesium sulfate and concentrated to dryness in vacuo to yield 37.1 g. of 2,4-difluorobenzylbromide.

Employing the method disclosed above but substituting for 2,4-difluorotoluene, an equimolar amount of the starting materials in Table I, there is obtained the tabulated products.

TABLE I

| Starting material | α-halogenated product |
| --- | --- |
| 2-methylpyridine | 2-bromomethylpyridine. |
| β-allylbenzene | Cinnamylbromide. |
| 2-bromotoluene | α-bromo-2-bromotoluene. |
| 1-methylnaphthalene | 1-bromomethylnaphthalene. |
| 2-methylnaphthalene | 2-bromomethylnaphthalene. |
| 4-fluorotoluene | α-bromo-4-fluorotoluene. |
| 4-chlorotoluene | α-bromo-4-chlorotoluene. |
| 2-chloro-β-allylbenzene | 2-chlorocinnamylbromide. |
| 2-chloro-3-methylnaphthalene | 2-chloro-3-bromomethylnaphthalene. |
| 2-chloro-3-methylthiophene | 2-chloro-3-bromomethylthiophene. |
| 2-amino-4-methylpyridine | 2-amino-4-bromomethylpyridine. |
| 1-ethyl-2-methylquinoline | 1-ethyl-2-bromomethylquinoline. |
| 2-acetyltoluene | α-bromo-2-acetyltoluene. |
| 4-phenoxytoluene | α-bromo-4-phenoxytoluene. |
| 4-trifluoromethyltoluene | α-bromo-4-trifluoromethyltoluene. |
| 3-trifluoromethyltoluene | α-bromo-3-trifluoromethyltoluene. |
| 4-mercaptotoluene | α-bromo-4-mercaptotoluene. |
| 4-trifluoromethylthiotoluene | α-bromo-4-trifluoromethylthiotoluene. |
| 4-nitrotoluene | α-bromo-4-nitrotoluene. |
| 4-nitro-β-allylbenzene | 4-nitrocinnamylbromide. |
| 5-nitro-3-methylfuran | 5-nitro-3-bromomethylfuran. |
| 6-cyano-2-methylpyridine | 6-cyano-2-bromomethylpyridine. |
| 3-carbethoxy-2-methylpyridine | 3-carbethoxy-2-bromomethylpyridine. |
| 4-diethylaminotoluene | α-bromo-4-diethylaminotoluene. |
| 4-dimethylsulfamyltoluene | α-bromo-4-dimethylsulfamyltoluene. |
| 3-ter-butyltoluene | α-bromo-3-ter-butyltoluene. |
| 4-phenyl-2-methylthiazole | 4-phenyl-2-bromomethylthiazole. |
| 1-benzylnaphthalene | α-bromo-1-benzylnaphthalene. |
| 2-fluoro-4-chlorotoluene | α-bromo-2-fluoro-4-chlorotoluene. |
| 3,5-di(mercapto)-4-methylpyridine | 3,5-di(mercapto)-4-bromomethylpyridine |
| 2,5-diphenyl-3-methylfuran | 2,5-diphenyl-3-bromomethylfuran. |
| 2,4,6-triphenyltoluene | α-bromo-2,4,6-triphenyltoluene. |
| 2,5-diphenyl-4-chloro-3-methylfuran | 2,5-diphenyl-4-chloro-3-bromomethylfuran. |
| 2,3,5,6-tetramethoxytoluene | α-bromo-2,3,5,6-tetramethoxytoluene. |
| Pentafluorotoluene | α-bromo-pentafluorotoluene. |
| 4,5-dimethoxy-2-phenyltoluene | α-bromo-4,5-dimethoxy-2-phenyltoluene. |
| 3,4,5-trimethoxytoluene | α-bromo-3,4,5-trimethoxytoluene. |

EXAMPLE 2

2-benzyloxybenzylchloride

To a solution of 40 g. of 2-benzyloxybenzyl alcohol in 40 ml. of dry benzene and 3 drops of dry pyridine is added 20.4 ml. of thionyl chloride and the solution is refluxed with stirring for 1 hour. The solution is cooled, washed 12 times with 500 ml. of cold water and is dried over anhydrous magnesium sulfate. The solvent is evaporated in vacuo to a colorless oil weighing 44.3 g.

Employing the method disclosed above, but substituting for 2-benzyloxybenzyl alcohol an equimolar amount of the alcohols in Table I, there is obtained the tabulated products.

TABLE I

| Starting material | α-halogenated product |
| --- | --- |
| 4-hydroxymethyl-10-ethylphenothiazine | 4-chloromethyl-10-ethylphenothiazine. |
| 2-hydroxymethylthiophene | 2-chloromethylthiophene. |
| 4-i-propylbenzylalcohol | α-chloro-4-i-propyltoluene. |
| 6-methoxy-2-hydroxymethylpyridine | 6-methoxy-2-chloromethylpyridine. |
| 2-hydroxymethyl-1-ethylpyrrole | 2-chloromethyl-1-ethylpyrrole. |
| 4-phenylbenzylalcohol | α-chloro-4-phenyltoluene. |
| 4-vinyl-2-hydroxymethylpyridine | 4-vinyl-2-chloromethylpyridine. |
| 5-benzyl-2-hydroxymethylthiophene | 5-benzyl-2-chloromethylthiophene. |
| 3-methyl-2-hydroxymethylfuran | 3-methyl-2-chloromethylfuran. |
| 1-isopropyl-5-hydroxymethylimidazole | 1-isopropyl-5-chloromethylimidazole. |
| 4-cyclohexylbenzylalcohol | 4-cyclohexylbenzylchloride. |
| 1-phenethyl-3-hydroxymethylpyrrolidine | 1-phenethyl-3-chloromethylpyrrolidine. |
| 2-methyl-5-hydroxymethylfuran | 2-methyl-5-chloromethylfuran. |
| 2-methyl-5-hydroxymethylthiophene | 2-methyl-5-chloromethylthiophene. |
| 3-methoxybenzylalcohol | α-chloro-3-methoxytoluene. |
| 4-methoxybenzylalcohol | α-chloro-4-methoxytoluene. |
| 4-methylthiobenzylalcohol | α-chloro-4-methylthiotoluene. |
| 4-methylsulfonylbenzylalcohol | α-chloro-4-methylsulfonyltoluene. |
| 2-methylthio-4-hydroxymethylthiazole | 2-methylthio-4-chloromethylthiazole. |
| 5-hydroxymethyl-1-cyclohexylimidazole | 5-chloromethyl-1-cyclohexylimidazole. |
| 2-chlorobenzylalcohol | α-chloro-2-chlorotoluene. |
| 3-chlorobenzylalcohol | α-chloro-3-chlorotoluene. |
| 1-chloro-2-hydroxymethylnaphthalene | 1-chloro-2-chloromethylnaphthalene. |
| 2,6-dichlorobenzylalcohol | α-chloro-2,6-dichlorotoluene. |
| 3,5-di(methylthio)-2-hydroxymethylpyridine | 3,5-di(methylthio)-2-chloromethylpyridine. |
| 5-hydroxymethyl-2,3,4-trimethylpyridine | 5-chloromethyl-2,3,4-trimethylpyridine. |
| 2-cyanobenzylalcohol | α-chloro-2-cyanotoluene. |
| 2-cyano-5-hydroxymethylthiophene | 2-cyano-5-chloromethylthiophene. |
| 2-ethyl-5-nitrobenzylalcohol | α-chloro-2-ethyl-5-nitrotoluene. |
| 4-benzylphenylmethanol | α-chloro-4-benzyltoluene. |
| 2-hydroxymethyl-5-nitrofuran | 2-chloromethyl-5-nitrofuran. |
| 3-methyl-α-phenethylbenzylalcohol | α-chloro-3-methyl-α-phenethyltoluene. |
| α-methyl-4-i-propylbenzylalcohol | α-chloro-A-methyl-4-i-propyltoluene. |
| α-methyl-4-nitrobenzylalcohol | α-chloro-α-methyl-4-nitrotoluene. |
| 1-(α-hydroxy)-ethylnaphthalene | 1-(α-chloro)-ethylnaphthalene. |
| 1-(α-hydroxy)-benzylnaphthalene | 1-(α-chloro)-benzylnaphthalene. |
| α-cyclopropylbenzylalcohol | α-chloro-α-cyclopropylotoluene. |
| α-propylbenzylalcohol | α-chloro-α-propyltoluene. |
| α-phenyl-2-hydroxymethylquinoline | α-phenyl-2-chloromethylquinoline. |
| α-cyclopropyl-2-hydroxymethylfuran | α-cyclopropyl-2-chloromethylfuran. |
| 4-chloro-α-phenylbenzylalcohol | α-chloro-4-chloro-α-phenyltoluene. |
| α-phenyl-3-methylbenzylalcohol | α-chloro-α-phenyl-3-methyltoluene. |
| 2-(α-hydroxy)-ethylpyridine | 2-(α-chloro)-ethylpyridine. |
| 2-(α-hydroxy)-phenethylthiophene | 2-(α-chloro)-phenethylthiophene. |

EXAMPLE 3

4-chloromethylthiazole (Step A) Preparation of 4-hydroxymethylthiazole: 4-formylthiazole (20 grams, 0.177 mole) and ethanol (175 ml.) is added to sodium borohydride (3.4 g., 0.089 m.) in 75 ml. of ethanol. The mixture is stirred and kept at about 25° with an ice bath. The addition takes approximately ½ hour and stirring is continued for an additional hour at room temperature. Glacial acetic acid (6 ml.) in water (20 ml.) is added dropwise. The product is evaporated under vacuum to a small volume and extracted three times with chloroform. The chloroform solution is washed with saturated sodium bicarbonate and then water. It is then dried and evaporated under vacuum to give 3.44 grams of 4-hydroxymethylthiazole.

(Step B) Preparation of 4-chloromethylthiazole: Thionyl chloride (10 ml.) is added dropwise with cooling to the 4-hydroxymethylthiazole (3.44 grams) of Step A. A vigorous reaction results. After completion, the excess thionyl chloride is removed under vacuum to yield 4-chloromethylthiazole hydrochloride.

EXAMPLE 4

2-chloromethyl-5-chlorothiophene

A mixture of concentrated hydrochloric acid (45.6 ml.) and 37% Formalin (45 ml.) is saturated with dry hydrochloric acid at 0–10° C. with stirring and added in a slow stream to a mixture of 5-chlorothiophene (71.6 g.) and zinc chloride (1 g.) at 35–40° C. The reaction mixture is then stirred for an additional two hours. Cold water (114 ml.) is then added. The oil which separates is washed two times with cold water. Dicyclohexylamine (2 ml.) is then added and the product distilled under vacuum; the portion boiling at 90–96% C./9–10 mm. is collected.

EXAMPLE 5

4-chloromethylimidazole (Step A) Preparation of 4,5-dicarboxyimidazole: 4,5-di(ethoxycarbonyl)imidazole (100 g.) in 400 ml. of 2.5 N sodium hydroxide solution is allowed to stand at room temperature overnight. The disodium salt precipitates. It is mixed with concentrated hydrochloric acid, cooled and filtered. The filtrate is stirred with fresh water, filtered and air-dried to give 72 g. of 4,5-dicarboxyimidazole.

(Step B) Preparation of 4-anilinocarbonylimidazole: A mixture of 4,5-dicarboxyimidazole from Step A (200 g.) and aniline (1000 ml.) is refluxed with stirring for three days. The aniline is then removed by steam distillation. The product is filtered, washed with water and then dissolved in acid. The insolubles are filtered off and the filtrate made alkaline with sodium carbonate. The precipitate is then filtered and washed with water.

(Step C) Preparation of 4-carboxyimidazole: The 4-anilinocarboxyimidazole from Step B is added to 1000 ml. of concentrated hydrochloric acid and the mixture refluxed for four hours and then evaporated to dryness. The residue is dissolved in water, made alkaline with sodium carbonate, extracted with ether, charcoaled, adjusted to pH=4 with hydrochloric acid, and allowed to stand in the cold overnight. The product is then filtered and washed with cold water. The filtrate is evaporated at room temperature and atmospheric pressure. The residue is washed with cold water and air-dried to yield 85 g.

(Step D) Preparation of 4-ethoxycarbonylimidazole: A mixture of the 4-carboxyimidazole from Step C and 1½ liters of ethanol is saturated with hydrochloric acid and refluxed until homogenous. The reaction mixture is evaporated under vacuum. The residue is then dissolved in water, charcoaled, and treated with sodium bicarbonate. The solid is filtered, washed with cold water, and air-dried. The aqueous filtrate is extracted with chloroform, and the chloroform evaporated under vacuum. The total yield of product is 73 g.

(Step E) Preparation of 4-hydroxymethylimidazole: 4-ethoxycarbonylimidazole (28 grams) from Step D is added portionwise with stirring over a half-hour period to lithium aluminum hydride (10 g.) in 300 ml. of ether. After the addition is complete, the reaction mixture is allowed to stand overnight. Water (25 ml.) is added dropwise. The resulting solid is filtered and suspended in 300 ml. of hot methanol, saturated with carbon dioxide and filtered. The product is extracted again with hot methanol. The extracts are combined and evaporated under vacuum. The residue is taken up in 300 ml. of hot ethanol, filtered and evaporated under vacuum. The residue is then treated with ethanolic hydrochloric acid. The resulting solid is cooled, diluted with ether and then filtered. The product is then washed with ether and dried under vacuum.

(Step F) Preparation of 4-chloromethylimidazole: 4-hydroxymethylimidazole hydrochloride (10 g.) from Step E is suspended in 50 ml. of dry benzene, and 14 ml. of thionyl chloride in 50 ml. of benzene is added slowly with stirring. After addition is complete the reaction mixture is refluxed with stirring for two hours. It is then evaporated under vacuum to yield the 4-chloromethylimidazole hydrochloride.

EXAMPLE 6

2-chloromethylphenothiazine

Thionyl chloride (15 ml.) is added dropwise with agitation to 6.87 g. (.03 m.) of 2-hydoxymethylphenothiazine in an ice bath. The reaction is kept cool for an additional 2 hours. The excess thionyl chloride is removed under reduced pressure, keeping the reaction mixture under 50° C. to yield 2-chloromethylphenothiazine hydrochloride.

EXAMPLE 7

3-(4-fluorobenzylthio)-propionic acid

A mixture of 3.18 g. (0.03 m.) of 3-mercaptopropionic acid and 4.5 g. (0.03 m.) of 4-fluorobenzylchloride is heated in an oil bath, the temperature of which is slowly raised to 155° whereupon the evolution of hydrogen chloride begins. The heating is continued for about 1½ hours until the evolution of gas ceases. The reaction mixture is cooled and the residue which gradually crystallizes is recrystallized from ether petroleum ether to give 3.5 g. of 3-(4-fluorobenzylthio)propionic acid, M.P. 66–68° C.

When 2,3,4,5,6-pentafluorobenzyl bromide, 3-chlorobenzyl chloride, 2-chlorobenzyl chloride and cinnamyl bromide are used in place of 4-fluorobenzyl chloride in the procedure described above, then 3-(2,3,4,5,6-pentafluorobenzylthio)-propionic acid (M.P. 95–97° C.), 3-(3-chlorobenzylthio)-propionic acid (B.P. 150–6°/0.17 mm.) and 3-(2-chlorobenzylthio)-propionic acid (B.P. 150–160°/0.20 mm.) and 3-(cinnamylthio)-propionic acid (M.P. 85–88° C.) are obtained.

EXAMPLE 8

3-(α-proplybenzylthio)-butyric acid

To a solution of 3.4 g. (.02 m.) of α-chloro-α-propyltoluene in 350 ml. of xylene is added 2.4 g. (0.2 m.) of 3-mercapto butyric acid. The reaction mixture is refluxed for 6 hours and then evaporated to dryness. The residue is then treated with water and made acid with diluted hydrochloric acid. This is then extracted with chloroform, dried over sodium sulfate and evaporated to dryness to yield 3-(α-propylbenzylthio)-butyric acid.

EXAMPLE 9

3-(3-chlorobenzylthio)-propionic acid

To a solution of 0.2 m. of 3-chlorobenzyl chloride in 1 liter of ethanol is added a solution of 0.2 m. of 3-mercaptopropionic acid in 200 ml. of water containing 0.4 m. of sodium hydroxide. The reaction mixture is refluxed for 1 hour and then concentrated in vacuo. The residue is taken up into water and extracted with ether. The aqueous portion is acidified with hydrochloric acid and extracted well with chloroform. The combined chloroform extracts are dried over sodium sulfate and concentrated to yield 3-(3-chlorobenzylthio)-propionic acid, B.P. 150–6°/0.17 mm.

EXAMPLE 10

3-(3,4-dichlorobenzylthio)-propionic acid

To a stirred mixture of 5.3 g. (0.05 m.) of 3-mercaptopropionic acid in about 150 ml. of refluxing liquid ammonia is added portionwise 9.8 g. (0.05 m.) of 3,4-dichlorobenzyl chloride. The reaction mixture is stirred until a clear solution results at which time the ammonia is allowed to evaporate. The residue is distributed between water and ether and the mixture strongly acidified. The ether layer is separated and the aqueous layer extracted well with ether. The combined ether extracts are washed with water, dried over sodium sulfate and concentrated. The residue is recrystallized from hexane to yield 11.3 g. of 3-(3,4-dichlorobenzylthio)-propionic acid, M.P. 73–5°.

When 2,6-dichlorobenzyl chloride, 4-chlorobenzyl chloride, 4-phenylbenzyl chloride, 2-nitrobenzyl chloride, 1-naphthylmethyl chloride, 2-naphthylmethyl chloride, 4-chloromethylthiazole hydrochloride, 2-chloromethyl pyridine and 2-chloromethylphenothiazine are used in place of 3,4-dichlorobenzyl chloride in the procedure above, then 3-(2,6-dichlorobenzylthio)-propionic acid (M.P. 75.5–78° C.), 3-(4-chlorobenzylthio)-propionic acid (M.P. 64.6° C.), 3-(4-phenylbenzylthio)-propionic acid (M.P. 142.5–144.5° C.), 3-(2-nitrobenzylthio)-propionic acid (M.P. 80.5–81.5° C.), 3-(1-naphthylmethylthio)-propionic acid (M.P. 67–68.5° C.), 3-(2-naphthylmethylthio)-propionic acid (M.P. 100.5–104.5° C.), 3-(4-thiazolylmethylthio)-propionic acid (M.P. 127–129° C.), 3-(2-pyridylmethylthio)-propionic acid (M.P. 89–90° C.), and 3-(2-phenothiazolylmethylthio)-propionic acid are obtained.

EXAMPLE 11

When the procedure of Example 7 is followed but substituting for 3-mercaptopropionic acid an equimolar amount of the substituted propionic acids in Table I below with the α-halogenated products of Table I, Examples 1 and 2 in place of 4-fluorobenzyl chloride, there is obtained each of the corresponding propionic acids.

TABLE I 3-mercaptopropionic acid
3-mercapto-2-methylpropionic acid
3-mercaptobutyric acid
2-mercaptomethylbutyric acid
3-mercaptovaleric acid
3-mercapto-2,2-dimethylpropionic acid
2-mercaptocyclobutane carboxylic acid
3-mercapto-2-phenylpropionic acid
3-mercapto-2,3-diphenylpropionic acid
3-mercapto-2,2-di-2,4-xylylpropionic acid
3-mercapto-2-benzylpropionic acid

EXAMPLE 12

When the procedures of Examples 7, 8 and 9 are followed using the appropriately substituted aryl or heteroarylmethyl halides with the appropriately substituted mercaptopropionic acids of Table I, Example 11, there are obtained the desired thiopropionic acids below:

TABLE I 3-(4'-thiazolylmethylthio-2-butyric acid
3-(2'-pyridylmethylthio)-butyric acid
3-(2'-thienylmethylthio)-2,3-dimethylpropionic acid
2-(2-bromobenzylthio)-cyclobutane carboxylic acid
3-(2-cyanobenzylthio)-butyric acid
3-(2-carboxybenzylthio)-butyric acid
3-[2'-(3'-methylfurylmethylthio)]-propionic acid
2-[2'-(6'-methylpyridylmethylthio)]-cyclopropane carboxylic acid
3-(3-methoxybenzylthio)-2-methylbutyric acid
3-[5'-(1'-isopropylimidazolylmethylthio)]-propionic acid
3-(4-trifluoromethylbenzylthio)-propionic acid
3-(3-trifluoromethylbenzylthio)-propionic acid
3-(4-dimethylaminosulfonylbenzylthio)-propionic acid
3-[4'-(2'-aminopyridylmethylthio)]-propionic acid
3-(4-p-nitrophenylbenzylthio)-propionic acid
α,α-diphenylbenzylthiopropionic acid
2-[2'-(5'-nitrofurylmethylthio)]-butyric acid
3-[2'-(5'-dimethylaminofurylmethylthio)]-butyric acid
3-(2-acetylbenzylthio)-propionic acid
3-[2'-(3'-carboxypyridylmethylthio)]-propionic acid
3-[3'-(1'-phenethylpyrrolylmethylthio)]-propionic acid
3-(4-diethylaminobenzylthio)-isobutyric acid
3-[2'-(3',5'-di(methylthio)pyridylmethylthio)]-propionic acid
3-[2'-(4'-phenylthiazolylmethylthio)]-propionic acid
2-(2,4-dichlorobenzylthio)-cyclopropane carboxylic acid
(3-(5'-(2'-chloro-3'-thienylmethylthio)]-propionic acid)
3-(2,4,6-triphenylbenzylthio)-propionic acid
3-(2,3,5,6-tetramethoxybenzylthio)-propionic acid
3-(2-ethyl-5-nitrobenzylthio)-isobutyric acid
3-[1'-(α-phenyl)naphthylmethylthio)]-butyric acid
3-(α-methyl-4-i-propylbenzylthio)-butyric acid
3-(3'-methyl-α-phenylbenzylthio)-butyric acid
3-(3-methyl-α-phenethylbenzylthio)-propionic acid
3-(α-cyclopropylbenzylthio)-propionic acid
3-(α-isopropylbenzylthio)-propionic acid
3-(α-phenylbenzylthio)-2-phenylpropionic acid
3-(α-phenylbenzylthio)-2-methylbutyric acid
3-(2'-methyl-5'-furylmethylthio)-propionic acid
3-[2'-(5'-chlorothienylmethylthio)-propionic acid
3-(2'-methyl-5'-thienylmethylthio)-propionic acid

EXAMPLE 13

When the procedure of Example 10 is followed but substituting for 3-mercaptopropionic acid an equimolar amount of the substituted thiopropionic acids in Table I of Example 12, there is obtained the corresponding substituted propionic acids of the 3-(3,4-dichlorobenzylthio), 3-(2,6-dichlorobenzylthio), 3-(4-chlorobenzylthio), 3-(4-phenylbenzylthio), 3-(1-naphthylmethylthio), 3-(2-naphthylmethylthio), 3-(2-pyridylmethylthio), 3-(4-thiazolylmethylthio) and 3-(2-phenothiazylmethylthio) compounds.

EXAMPLE 14

α-Phenylbenzyl mercaptan

A solution of 15 g. (.07 m.) α-phenylbenzyl chloride in 600 ml. of ethanol is vigorously stirred with 5.4 g. (.07 m.) of thiourea at reflux temperature for 35 hours. This is then evaporated to dryness and the residue heated on a steam bath with 20% NaOH (100 ml.) for 3 hours. This is then cooled and constantly extracted with ether for 6 hours. Evaporation of the ether gives α-phenylbenzyl mercaptan.

Employing the method disclosed above, but substituting for α-phenylbenzyl chloride an equimolar amount of the substituted halides in Table I, there is obtained the corresponding mercaptan, examples of which are in Table I below.

TABLE I

| Starting halide | Product |
|---|---|
| 2-naphthylmethylchloride | 2-naphthylmethylthiol. |
| 2-bromomethylpyridine | 2-pyridylmethylthiol. |
| 1-bromomethylnaphthalene | 1-naphthylmethylthiol. |
| 4-chloromethylthiazole | 4-thiazolylmethylthiol. |
| 2-chlorobenzyl chloride | 2-chloro-α-toluenethiol. |
| 4-vinylbenzyl chloride | 4-vinyl-α-toluenethiol. |
| 2-ethoxybenzyl bromide | 2-ethoxy-α-toluenethiol. |
| 2-methoxy-6-chloromethylpyridine | 2-methoxy-6-mercaptomethylpyridine. |
| 5-nitro-3-furylmethylchloride | 5-nitro-3-furylmethylthiol. |
| 2-methylthiobenzylchloride | 2-methylthio-α-toluenethiol. |
| 2-cyanobenzylchloride | 2-carboxy-α-toluenethiol. |
| 4-phenethylbenzylchloride | 4-phenethyl-α-toluenethiol. |
| Ethyl-2-bromomethylbenzoate | 2-thiomethylbenzoic acid. |
| 3,4-dimethoxybenzylbromide | 3,4-dimethoxy-α-toluenethiol. |
| 2,5-diphenyl-3-chloromethylfuran | 2,5-diphenyl-3-furylmethylthiol. |
| 2,6-dichlorobenzylchloride | 2,6-dichloro-α-toluenethiol. |
| 3,4-dichlorobenzylchloride | 3,4-dichloro-α-toluenethiol. |
| 2,4-dichlorobenzylchloride | 2,4-dichloro-α-toluenethiol. |
| 2,6-difluorobenzylchloride | 2,6-difluoro-α-toluenethiol. |
| 2,5-dichloro-3-bromomethylthiophene | 2,5-dichloro-3-thienylmethylthiol. |
| 3,4-dimethylbenzylchloride | 3,4-dimethyl-α-toluenethiol. |
| 2,3,4-trimethyl-5-chloromethylpyridine | 2,3,4-Trimethyl-5-pyridylmethylthiol. |
| α-(4-toluidino)-benzylbromide | α-(4-toluidino)-α-toluenethiol. |
| 2,4-dichloro-α-methylbenzyl chloride | 2,4-dichloro-α-methyl-α-toluenethiol. |
| α-Methylbenzylchloride | α-Methyl-α-toluenethiol. |
| α-Isopropylbenzylchloride | α-Isopropyl-α-toluenethiol. |
| α-Phenylbenzylchloride | α-Phenyl-α-toluenethiol. |
| α-Methyl-3-bromomethylpyridine | α-Methyl-3-pyridylmethylthiol. |
| α-Cyclopropylbenzylchloride | α-Cyclopropyl-α-toluenethiol. |

EXAMPLE 15

2,2-dimethyl-3-(4-phenylbenzylthio)-propionic acid

A mixture of 4.0 g. (.02 m.) of 4-phenylbenzyl mercaptan and 3.6 g. (.02 m.) of 3-bromo-2,2-dimethyl-propionic acid is heated in an oil bath at 150° C. for 3 hours. The reaction mixture is cooled and the residue is recrystallized from benzene-hexane to yield 2,2-dimethyl-3-(4-phenylbenzylthio)-propionic acid.

EXAMPLE 16

3-benzylthio-butyric acid

To a magnetically stirred solution of 8.0 grams (0.2 m.) of sodium hydroxide in 250 ml. of ethanol is added 12.4 g. (0.1 m.) of benzylmercaptan. After stirring this mixture for twenty minutes, 12.2 g. (0.1 m.) of 3-chlorobutyric acid is added with cooling. The reaction mixture is gradually heated and maintained at reflux for 6 hours. The reaction mixture is concentrated in vacuo, water added to the residue and the resulting mixture acidified with hydrochloric acid. The mixture is extracted well with methylene chloride. The combined methylene chloride extracts are extracted well with saturated sodium bicarbonate. The combined bicarbonate extracts are acidified and extracted well with chloroform, and the combined chloroform extracts are dried over sodium sulfate and concentrated. Vacuum distillation of the residue gives 6.6 g. 3-benzylthiobutyric acid, B.P. 136–139° C./0.3 mm.

When α-methylbenzyl mercaptan and 2-carboxybenzyl mercaptan are used in place of benzyl mercaptan in the procedure described above, then 3-(α-methylbenzylthio)-butyric acid and 3-(2-carboxybenzylthio)-butyric acid are obtained.

EXAMPLE 17

3-(3,4-dichlorobenzylthio)-propionic acid

To a stirred mixture of 7.6 g. (0.05 m.) of 3-bromopropionic acid in about 150 ml. of refluxing liquid ammonia is added portionwise 9.6 g. (0.05 m.) of 3,4-dichloro-α-toluenethiol. The reaction mixture is stirred until a clear solution results at which time the ammonia is allowed to evaporate. The residue is distributed between water and ether and the mixture strongly acidified. The ether layer is separated and the aqueous layer extracted well with ether. The combined ether extracts are washed with water, dried over sodium sulfate and concentrated. The residue is recrystallized from hexane to yield 11.3 g. of 3-(3,4-dichlorobenzylthio)-propionic acid, M.P. 73–75° C.

When 2,6-dichloro-α-toluenethiol, 4-chloro-α-toluenethiol, 1-naphthylmethylmercaptan, 2-mercaptomethylpyridine and 4-mercaptomethylthiazole are used in place of 3,4-dichloro-α-toluenethiol in the procedure above, the 3-(2,6-dichlorobenzylthio)-propionic acid (M.P. 75.5–78° C.), 3-(4-chlorobenzylthio)-propionic acid (M.P. 64–66° C.), 3-(1-naphthylmethylthio)-propionic acid (67–68.5° C.), 3-(2-pyridylmethylthio)-propionic acid (M.P. 89–90° C.) and 3-(4-thiazolylmethylthio)-propionic acid (M.P. 127–129° C.) are obtained.

EXAMPLE 18

When the procedure of Example 15 is followed but substituting for 3-bromo-2,2-dimethylpropionic acid an equimolar amount of the substituted propionic acids of Table I below with each of the substituted thiols of Table I, Example 14, in place of 4-phenylbenzylmercaptan, there is obtained each of the corresponding acids:

TABLE I 3-bromo-2,2-diphenylpropionic acid
3-chloropropionic acid
3-bromobutyric acid
3-bromo-2,2-dimethylpropionic acid
3-bromo-2-ethylpropionic acid
2-chlorocyclobutanecarboxylic acid
2-bromocyclopropanecarboxylic acid
3-bromo-2-benzylpropionic acid
3-bromo-2,2-dimethylbutyric acid
3-bromo-2,2,3,3-tetramethylpropionic acid
1-bromomethylcyclopropanecarboxylic acid
3-bromo-3-phenylpropionic acid
3-bromo-2,3-diphenylpropionic acid
3-bromo-3-(p-tolyl)-propionic acid

EXAMPLE 19

When the procedure of Example 17 is followed but substituting for 3-bromopropionic acid an equimolar amount of the substituted halo propionic acids in Table I, Example 18, there is obtained the corresponding substituted propionic acids of the 3-(3,4-dichlorobenzylthio), 3-(2,6-dichlorobenzylthio), 3 - (4 - chlorobenzylthio), 3-(1-naphthylmethylthio), 3 - (2 - pyridylmethylthio) and 3-(4-thiazolylmethylthio) compounds.

EXAMPLE 20

When the procedures of Examples 15, 16 and 17 are followed using the appropriate substituted aryl or heteroaryl methyl mercaptans with the appropriate branched halopropionic acids of Example 18, Table I, there are obtained the following thiopropionic acids:

TABLE I 3-(4-vinylbenzylthio)-propionic acid
3-(2-hydroxybenzylthio)-propionic acid

TABLE I—Continued 1-(2 - chlorobenzylthiomethyl) - cyclopropane carboxylic acid
2-(2-naphthylmethylthio)-cyclopropane carboxylic acid
3-(4-phenethylbenzylthio)-propionic acid
3-(2-methylthiobenzylthio)-propionic acid
2-(2,4 - dichlorobenzylthio)-2 - methylcyclopropane carboxylic acid
3-(3,4-dimethylbenzylthio)-propionic acid
3-(2',3',4'-trimethyl-5'-pyridylmethylthio)-2-methylpropionic acid
3-(3',4-dimethoxybenzylthio)-3-phenylpropionic acid
3-(α-phenylbenzylthio)-2,2,3-trimethylpropionic acid
3-(α-cyclopropylbenzylthio)-propionic acid
3-(5'-nitro-3'-furylmethylthio)-2-methylpropionic acid

EXAMPLE 21

2-methyl-3-(2-aminobenzylthio)-propionic acid

To a solution of 5.1 g. (0.2 m.) of 2-methyl-3-(2-nitrobenzylthio)-propionic acid in 40 ml. of methanol is added 0.25 g. of 10% palladium-on-carbon. This mixture is then reduced with hydrogen at room temperature and 40 lb./in.² pressure. The reaction mixture is then filtered through a pad of filter gel, concentrated to dryness and the product recrystallized from a mixture of ethyl acetate/hexane.

When an equimolar amount of 3-(5'-nitro-3'-furylmethylthio)-2-methylpropionic acid is used in place of 2-methyl-3-(2-nitrobenzylthio)-propionic acid in the above procedure, then the product synthesized is 3-(5'-amino-3'-furylmethylthio)-2-methylpropionic acid.

EXAMPLE 22

2,2-dimethyl-3-(2-hydroxybenzylthio)-propionic acid 2,2-dimethyl-3-(2 - methoxybenzylthio)-propionic acid (3.8 g., .015 m.) is dissolved in 35 ml. of 30–33% HBr in acetic acid. This is then refluxed for 2 hours and then evaporated to dryness. The crude product is then recrystallized from a mixture of benzene-hexane.

When an equimolar amount of 3-(2'-methoxy-6'-pyridylmethylthio)-propionic acid is used in place of 2,2-dimethyl-3-(2-methoxybenzylthio)-propionic acid in the above procedure, then the product synthesized is 3-(2'-hydroxy-6'-pyridylmethylthio)-propionic acid.

EXAMPLE 23

When the procedure of Example 7 is followed but substituting for 3-mercaptopropionic acid an equimolar amount of the ester, amide, alcohol, ether or amine derivatives of the substituted propionic acids of Table I, Example 11, with the α-halogenated products of Tables I, Examples 1 and 2, in place of 4-fluorobenzylchloride, there is obtained each of the corresponding propionic acid ester, amide, alcohol, ether and amine derivatives.

EXAMPLE 24

When the procedure of Example 17 is followed but substituting for 3-bromo-2,2-dimethylpropionic acid an equimolar amount of the ester, amide, alcohol, ether or amine derivatives of the substituted propionic acids of Table I, Example 18, with each of the substituted thiols of Table I, Example 14, in place of 4-phenylbenzylmercaptan, there is obtained each of the corresponding propionic acid ester, amide, alcohol, ether and amine derivatives.

EXAMPLE 25

3-(2-chlorobenzylthio)-propionyl morpholide (A) 3-(2-chlorobenzylthio) - propionyl chloride: To a solution of 5.0 g. (0.022 m.) of 3-(2-chlorobenzylthio)-propionic acid in 30 ml. of anhydrous benzene is added 2.86 g. (0.024 m.) of thionyl chloride. The reaction mixture is refluxed for 1½ hours and the solvent evaporated in vacuo to yield 3-(2-chlorobenzylthio)-propionyl chloride.

(B) 3-(2 - chlorobenzylthio) - propionyl morpholide: To 20 ml. of morpholine is added dropwise and with cooling the propionyl chloride prepared above. The reaction mixture is stirred at room temperature for 2 hours, acidified with 2.5 N hydrochloric acid and extracted well with methylene chloride. The combined methylene chloride extracts are then extracted with 2.5 N sodium hydroxide, washed with water, dried over sodium sulfate and concentrated in vacuo to yield 3-(2-chlorobenzylthio)-propionyl morpholide.

When ammonia, methylamine, diethylamine, cyclopropylamine, piperidine, piperazine, homopiperazine and pyrrolidine are used in place of morpholine in the procedure described above, then the amido, methylamido, diethylamido, cyclopropylamido, piperadino, piperazino, homopiperazino and pyrrolidino amides of 3-(2-chlorobenzylthio)-propionic acid are prepared.

In a similar manner the acids of these examples are converted to the corresponding amides.

EXAMPLE 26

3-(2-chlorobenzylthio)-propanol

To a stirred suspension of 0.62 g. (0.016 m.) of lithium aluminum hydride in 50 ml. of dry ether is added dropwise a solution of 5.0 g. (0.022 m.) of 3-(2-chlorobenzylthio)-propionic acid. The reaction mixture is stirred for thirty minutes after the addition is completed. The excess hydride is then decomposed by the cautious addition of water, 30 ml. of 10% $H_2SO_4$ is added and the resulting mixture extracted well with ether. The combined ether extracts are dried over sodium sulfate and concentrated in vacuo. The residue which contains some starting acid dissolved in methylene chloride is washed with 10% NaOH, water and dried over sodium sulfate. Removal of the solvent in vacuo and chromatography of the residue on silica gel (110 g.=elution with 70% benzene-petroleum ether) gives 1.0 g. of 3-(2-chlorobenzylthio)-propanol, B.P. 133–4° C./0.5 mm.

When 3-(2,6-dichlorobenzylthio)-propionic acid and 3-(2'-pyridylmethylthio)-propionic acid are used in place of 3-(2-chlorobenzylthio)-propionic acid, then 3-(2,6-dichlorobenzylthio)-propanol and 3-(2'-pyridylmethylthio)-propanol are obtained.

In a similar manner the acids of these examples are converted to the corresponding propanols.

EXAMPLE 27

Methyl 3-(4-fluorobenzylthio)-propionate

To an ether solution (75 ml.) of 3-(4-fluorobenzylthio)-propionic acid [4.4 g. (.02 m.)], there is added an ether solution (ca. 150 ml.) of diazomethane (ca. .02 m.). This is allowed to stand for 2 hours and then the ether is evaporated off slowly with mild warming to yield methyl 3-(4-fluorobenzylthio)-propionate.

When 3-(4-thiazolylmethylthio)-propionic acid is used in place of 3-(4-fluorobenzylthio)-propionic acid in the example above, then methyl 3-(4-thiazolylmethylthio)-propionate is obtained.

In a similar manner the acids of these examples are converted to the corresponding methyl esters.

EXAMPLE 28

3-(4-hydroxybenzylthio)-isobutyl-N-piperazine dihydrogen chloride

To a cooled (ice bath) suspension of lithium aluminum hydride (.46 g., .012 m.) in 15 ml. of dry ether is added an ether solution (100 ml.) of 3-(4-methoxybenzylthio)-isobutyl-N-piperazine (4.6 g., .015 m.). This reaction mixture is stirred for 2 hours, then the excess hydride is carefully decomposed with $H_2O$ and filtered through a pad of "Filter-Cel." This is then washed with ether and the combined ether is extracted thrice with 20 ml. portions of 10% NaOH and then with water. The ether is then dried over sodium sulfate and evaporated to ca. 50 ml.

Dry hydrochloric acid gas is then bubbled into the solution and the 3-(4-hydroxybenzylthio)-isobutyl-N-piperazine dihydrogen chloride collected and recrystallized from ethanol.

When 3 - (2'-thienylmethylthio)-2,3-dimethylpropionamide is used in place of 3-(4-methoxybenzylthio)-isobutyl-N-piperazine in the example above, then 3-(2'-thienylmethylthio)-2,3-dimethylpropylamine is obtained.

In a similar manner the amides of Example 25 are converted to the corresponding amines.

EXAMPLE 29

Ethyl 3-(4-dimethylaminobenzylthio)-propionate hydrochloride

A solution of 1.25 g. (.0046 m.) of ethyl 3-(4-nitrobenzylthio)-propionate and 1.6 ml. of 37% formaldehyde in 50 ml. of methanol is hydrogenated over 0.5 g. of 5% palladium-on-charcoal under 42 lbs. of hydrogen pressure until 5 equivalents of hydrogen are absorbed. The catalyst is filtered off and the filtrate is evaporated in vacuo. The oily residue is dissolved in absolute alcohol, treated with hydrogen chloride gas and then evaporated to dryness whereupon it crystallizes. The ethyl 3-(4-dimethylaminobenzylthio)-propionate hydrochloride is recrystallized from ethanol.

Employing the method disclosed above but substituting methyl 3-[2'-(5'-nitrofurylmethylthio)]-butyrate in place of ethyl 3-(4-nitrobenzylthio)-propionate, there is obtained the corresponding methyl 3-[2'-(5'-dimethylaminofurylmethylthio)]-butyrate hydrochloride.

EXAMPLE 30

Benzyl 3-(2'-pyridylmethylthio)-propionate hydrochloride (A) 3-(2'-pyridylmethylthio)-propionyl chloride: To a solution of 2.95 g. (0.015 m.) of 3-(2'-pyridylmethlthio)-propionic acid in 25 ml. of anhydrous benzene is added 2.15 g. (0.018 m.) of thionyl chloride. The reaction mixture is refluxed for 1½ hours and the solvent evaporated in vacuo to yield 3-(2'-pyridylmethylthio)-propionyl chloride hydrochloride.

(B) Benzyl 3-(2'-pyridylmethylthio)-propionate: To 20 ml. of benzyl alcohol is added the propionyl chloride from step A. This is then heated on a steam bath for ¾ hour. This is then evaporated to dryness in vacuo and the benzyl 3-(2'-pyridylmethylthio)-propionate hydrochloride is recrystallized from ethanol.

In a similar manner the acids of these examples are converted to the corresponding esters.

EXAMPLE 31

Methyl 3-(2'-pyridylmethylthio)-propyl ether

To a suspension of 0.02 moles of sodium hydride in 50 cc. of dry dimethylformamide cooled to 0–5° and stirred under nitrogen is added dropwise a solution of 0.02 mole of 3-(2'-pyridylmethylthio)-propanol in 25 cc. dry dimethylformamide. The reaction mixture is stirred for 15 minutes after the addition is completed. There is then added dropwise a solution of 0.02 mole of methyl iodide in 20 mls. of dry dimethylformamide. The reaction mixture is stirred overnight at room temperature and then concentrated in vacuo. The residue is distributed between chloroform and dilute sodium hydroxide solution. The chloroform extracts are dried over sodium sulfate and concentrated to yield methyl 3-(2'-pyridylmethyl-thio)-propyl ether.

In a similar manner, the alcohols of these examples may be converted to the corresponding ethers providing there is only one active hydrogen group present in the starting alcohol.

EXAMPLE 32

The following tablet composition is illustrative of the compositions of this invention: Ten thousand tablets for oral use, each containing 25 mg. of 3-(2-chlorobenzylthio)-propionic acid are prepared from the following types and amounts of materials.

| Ingredient: | Grams |
|---|---|
| 3-(2-chlorobenzylthio)-propionic acid | 250 |
| Lactose U.S.P. | 1225 |
| Sucrose, powdered, U.S.P. | 1225 |
| Corn starch U.S.P. | 300 |

The finely powdered materials are mixed well and the mixture is granulated with 10% starch paste. The wet mass is forced through an 8-mesh screen, dried at 110° F. in a forced-air oven and then put through a 12-mesh screen. As lubricant, 30 grams of magnesium stearate is added before compressing into tablets.

In a similar manner, the claimed compounds of the previous examples may be converted into tablet compositions.

We claim:
1. A compound of the formula:

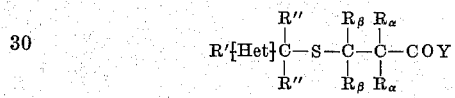

wherein:
Het is thiazolyl or pyridyl;
R' is hydrogen, loweralkyl, hydroxy, loweralkoxy, phenyl, loweralkylthio, carboxy or amino;
$R_\alpha$ and $R_\beta$ are hydrogen;
R'' is hydrogen or loweralkyl; and
Y is —OH, and OM where M is an alkali or alkaline earth metal, with the proviso that R'' is not hydrogen when Het is pyridyl and R', $R_\alpha$ and $R_\beta$ are hydrogen.

2. The compound of claim 1 wherein Y is —OH.

3. A compound according to claim 1 wherein Het is thiazolyl or pyridyl; R' is hydrogen; $R_\alpha$ and $R_\beta$ are hydrogen; R'' is hydrogen or loweralkyl; and Y is —OH.

4. A compound according to claim 1 wherein Het is 2-pyridyl, R', $R_\alpha$ and $R_\beta$ are hydrogen, R'' is loweralkyl and Y is —OH.

5. A compound according to claim 1 wherein Het is 4-thiazolyl, R', $R_\alpha$, $R_\beta$ and R'' are hydrogen and Y is —OH.

References Cited

UNITED STATES PATENTS

| 3,438,992 | 4/1969 | Shen et al. | 260—294.8 |
| 3,444,175 | 5/1969 | Shen et al. | 260—294.8 |

OTHER REFERENCES

Pierson: Chem. Abstracts (I), vol. 52, col. 4695, 1957.
Chem. Abstracts (II), vol. 53, cols. 8043–4, 1958.

ALAN L. ROTMAN, Primary Examiner

U.S. Cl. X.R.

260—240, 243, 247.1, 268, 270, 287, 289, 293.4, 294.8, 302, 306.8, 309, 326.3, 326.5, 332.2, 332.3, 347.2, 609; 424—247, 248, 250, 258, 266, 267, 270, 275, 285